May 25, 1965  W. E. CHANCE  3,185,272
HANDLES
Filed Dec. 27, 1962  3 Sheets-Sheet 1
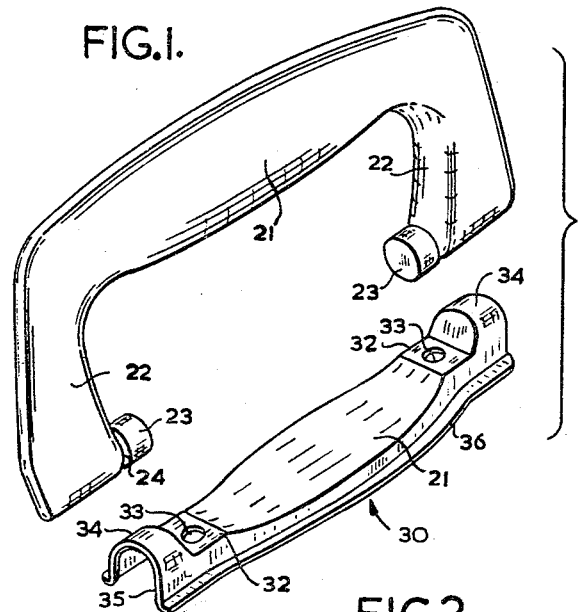
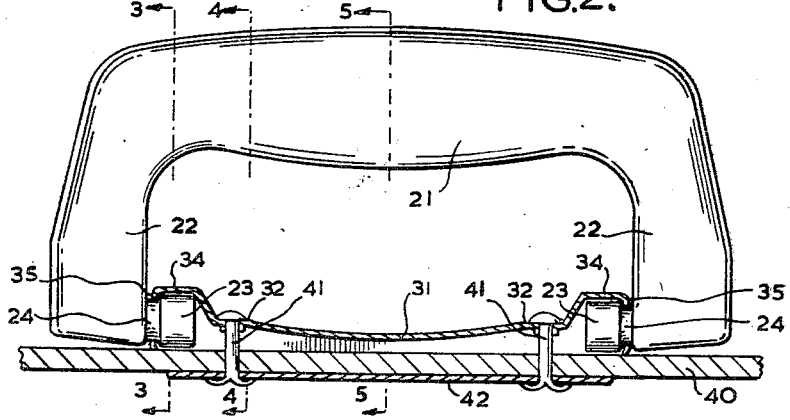
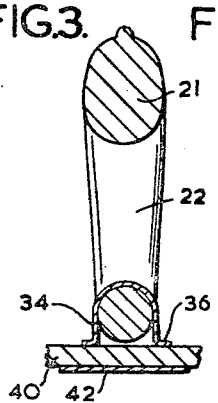 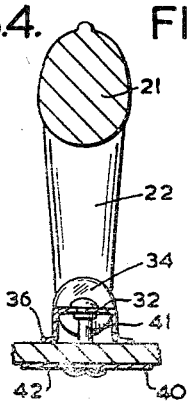 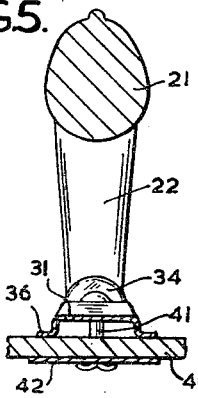
INVENTOR.
WILLIAM ERNEST CHANCE
BY Kurt Kelman
AGENT May 25, 1965  W. E. CHANCE  3,185,272
HANDLES
Filed Dec. 27, 1962  3 Sheets-Sheet 2
FIG.6.
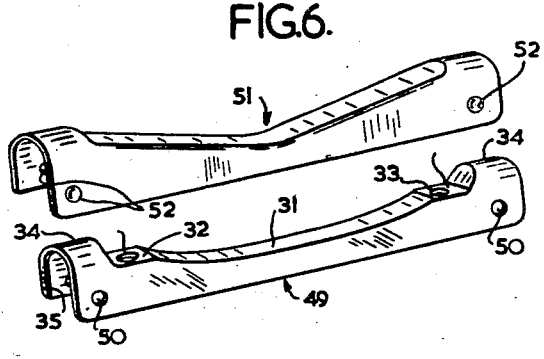
FIG.7.  FIG.8.  FIG.9.
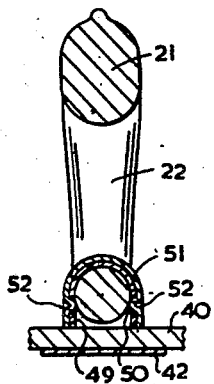 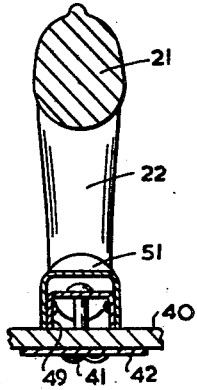 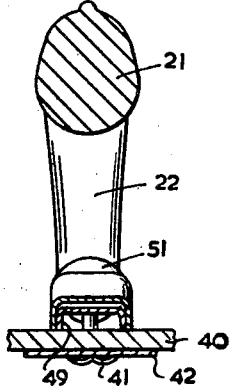
FIG.10.
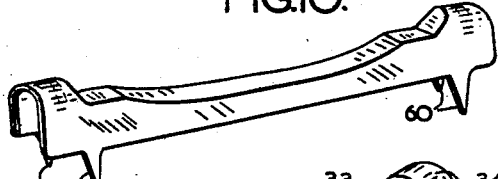
FIG.11.
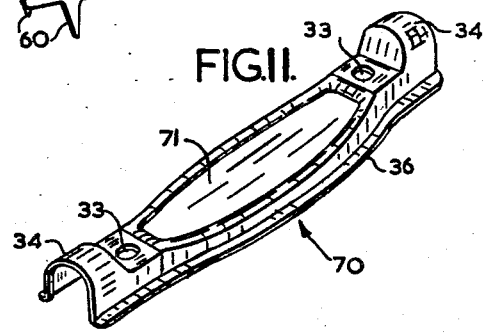
INVENTOR.
WILLIAM ERNEST CHANCE
BY Kent Zelman
agent

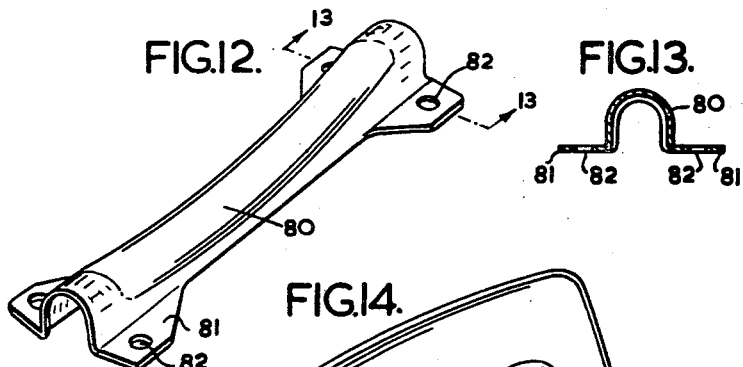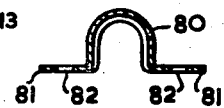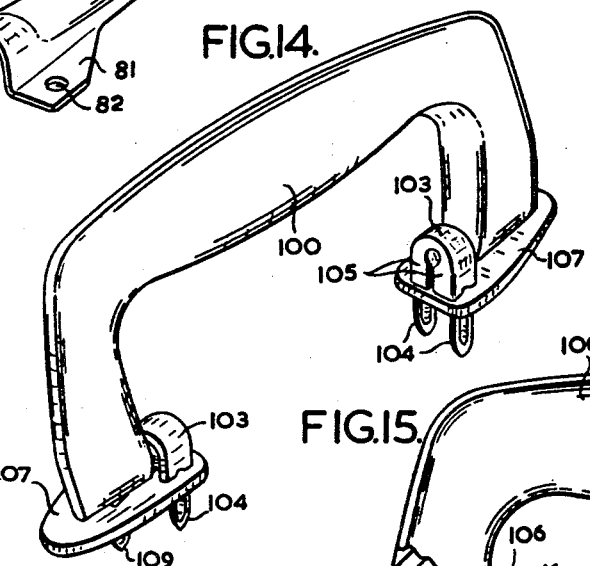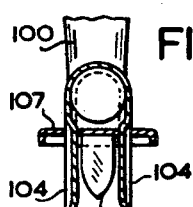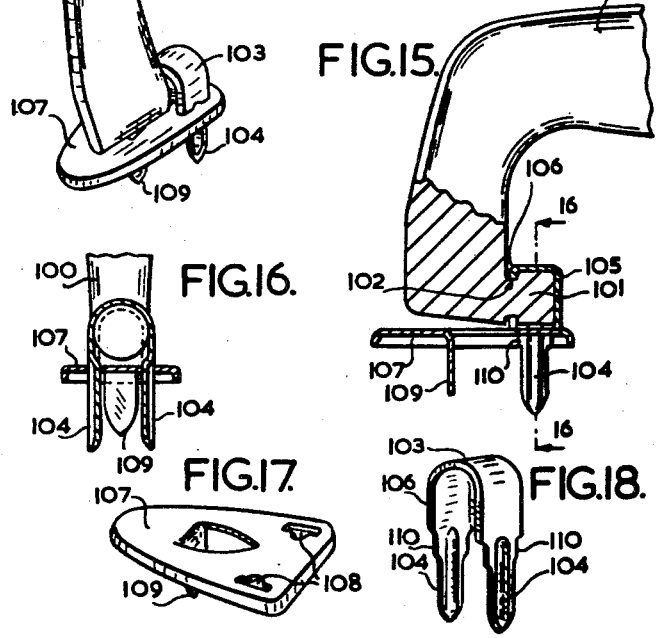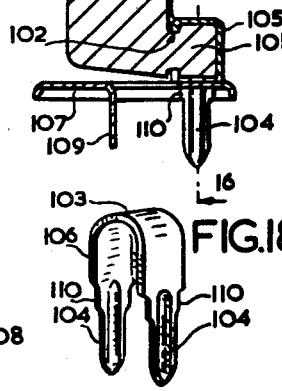

United States Patent Office 3,185,272
Patented May 25, 1965

3,185,272
HANDLES
William E. Chance, Birmingham, England, assignor to C. W. & Son Limited, Birmingham, England, a British company
Filed Dec. 27, 1962, Ser. No. 247,595
Claims priority, application Great Britain, Jan. 2, 1962, 199/62; Oct. 16, 1962, 39,030/62
3 Claims. (Cl. 190—57)

This invention relates to handles, for example, for suitcases, trunks, and other articles of luggage, and which essentially comprise a handle proper pivoted upon mounting means so as to fold flat to the article when not in use, or be held erect when in use.

The object of the invention is to provide an improved handle assembly which may be manufactured economically and assembled without difficulty.

In accordance with the invention, a handle ecomprises a handle proper provided with a pair of co-axial trunnions each of which has a peripheral groove, and at least one mounting plate having an inturned edge which seats in the groove and which overlaps the trunnions or corresponding trunnions so as to journal said trunnions for pivoting of the handle proper.

If a single mounting plate is provided the trunnions are directed towards one another and the plate is of channel-section; if two plates are provided, the trunnions may extend away from one another.

If desired, the mounting plate may be surmounted by a second and cover plate which may conceal any fixing expedients used to anchor the mounting plate to an article, and enables a variation in appearance to be effected by using different cover plates with a standard mounting plate.

Various embodiments of the invention are now described with reference to the accompanying drawings wherein:

FIGURE 1 is a perspective view of a handle assembly including a handle proper and its mounting plate;

FIGURE 2 is a sectional elevation of the handle assembly of FIGURE 1 assembled to an article of luggage;

FIGURES 3, 4 and 5 are sectional views on the lines 3—3, 4—4, and 5—5 of FIGURE 2;

FIGURE 6 is a perspective view of the mounting plate and cover plate of a second handle assembly;

FIGURES 7–9 are sections similar to FIGURES 3–5 but of the second handle assembly;

FIGURE 10 is a view of a third mounting plate;

FIGURE 11 is a view of a fourth mounting plate;

FIGURE 12 is a view of a fifth mounting plate;

FIGURE 13 is a section on the line 13—13, FIGURE 12;

FIGURE 14 is a perspective view of yet another handle assembly;

FIGURE 15 is a section on one end of the handle assembly of FIGURE 14;

FIGURE 16 is a view on the line 16—16, of FIGURE 15; and

FIGURES 17 and 18 are perspective views of parts of the assembly shown in FIGURES 14–16.

Turning now to the drawings, the handle assembly shown in FIGURES 1–5 comprises a handle proper which includes a first portion 21 which is horizontal or substantially so when the handle is used to suspend an article of luggage, dependent portions 22 at each end of the first portion and normal thereto, and integral trunnions 23 which are cylindrical, co-axial, directed towards each other, and have reduced diameter annular grooves or necks 24 between each trunnion and the said dependent portions.

Conveniently the handle proper is moulded as a single piece from a synthetic resinous plastics material and may have simulated wrinkles and stitching to resemble a built-up sewn leather handle. The contour and section of the handle may be varied to suit requirements, and of course the said first portion and dependent portions could be at different angles, or even contoured to a single curved piece. Moreover, the trunnions could be separate pieces fixed to the handle.

The handle assembly further comprises a mounting plate, generally indicated at 30, which in the example illustrated in FIGURES 1–5 is generally of inverted channel section. The centre portion 31 is of shallow channel section (FIGURE 5) and each penultimate end portion 32 adjacent portion 31 is of increased depth and is apertured at 33 in its flat top to accommodate fixing means. The final end portions 34 are stepped relative to the said portions, and are of inverted U-shape with inturned peripheral edges 35 to journal the trunnions 23, said edges seating in the annular groove 24. The whole plate has oppositely extending flanges 36 along both edges of the channel section.

FIGURE 2 shows the assembly secured to an article, of which part 40 only is shown. The securing is via bifurcated tubular rivets 41 passing through the channel section plate with heads seating thereon, through the part 40 and also through a washer plate 42, the ends being clinched thereon. Obviously other fixing expedients may be used, and the washer plate is only necessary with certain kinds of fixing expedients and certain types of material for the article 40.

The second handle assembly shown in FIGURES 6–9 utilises a handle proper similar or identical to that shown in FIGURES 1–5. The mounting plate, indicated generally at 49, is however modified, and is of constant and uniform width along its whole length, omits the longitudinal flanges 36, and is formed with pairs of small diameter holes 50 at each end. A second and cover plate, generally indicated at 51 is provided and is of similar inverted channel section to the plate 49. Plate 51 has small indents 52 at each end, in pairs. The cover plate is dimensioned to fit over plate 49 so that upon pressing it home the indents snap into the holes 50 to retain the two plates together.

This arrangement, seen in FIGURES 6–9, has the advantage of enabling a cheap standardised mounting plate 49 to be used, with variations in finish and appearance achieved by using differently finished and/or shaped cover plates. Moreover the fixing expedients 41 are completely hidden by the cover plate.

Obviously, other means can be used to secure the two plates together: for example the cover plate would be a tight fit and omit the indents, or could have tabs from its edges to engage in slots in the mounting plate.

The third mounting plate shown in FIGURE 10 is substantially similar to those in FIGURES 1–9, except that the holes 33 for fixing expedients are omitted, and tabs 60 are provided to pass through slits in the article, and preferably also in a washer plate, before being clinched over.

The fourth mounting plate, shown in FIGURE 11, is very similar to that in FIGURES 1–5, except that the centre portion of the plate 70 is provided with a well 71 of shallow depth, to accommodate an ornamental motif such as the luggage article makers name, or a piece of material matching the article or handle proper.

The plate shown in FIGURES 12 and 13 is generally similar to that of FIGURES 1–5, except that the channel section 80 is formed with laterally extending lugs or wings 81 apertured as at 82 to receive fixing rivets. This is a particularly robust and simple handle plate and has the advantage (from the point of view of sales to the lay public) that it looks strong.

All of the handles and plates so far described have utilised a single plate which extends between and overlaps the trunnions. The engagement of the inturned edges in the grooves of the trunnions prevents disengagement due to deformation of the handle or plate under excessive load. However, these trunnions must be directed towards one another and this imposes a limitation on the design.

In FIGURES 14–18 there is shown a handle assembly without such a limitation. Whilst it is illustrated as having trunnions directed towards one another, they could equally well be outwardly directed.

In FIGURES 14–18 the handle proper, 100, is substantially identical to those shown in FIGURES 1–5 and 7–9. Each trunnion 101 has a peripheral groove or neck 102.

The handle has a pair of mounting plates, one for each trunnion and each comprising a staple 103 of substantially U-shape and providing a pair of anchorage lugs 104 which are fluted for strength. The limbs of the U are joined by a bridge part which is semi-circular in section, and lateral face of the U is closed by webs 105 whilst the other has an inturned rim 106 which seats in the corresponding trunnion groove.

Each mounting also comprises an escutcheon plate 107 having slots 108 for the staple lugs and a lug 109 for independent securing of the plate to a luggage article.

Preferably the handle proper is assembled to the two staples which are then assembled to the escutcheon plates and are anchored thereto by upsetting portions 110 of the lugs. The assembly is mounted on, for example, a suitcase by passing all the lugs through slots therein and bending over the lugs on to the interior of the suitcase.

It will be realised that means other than lugs or prongs can be used to secure the mounting plate of FIGURES 14–18 to the luggage article, although these lugs or prongs are, in this case, to be preferred.

I claim:

1. A handle assembly for an article of luggage comprising a handle having a carrying loop and a pair of co-axial trunnions extending towards each other from said loop, each trunnion having a peripheral groove; a mounting plate of substantially channel shape with U-section end portions, both end portions having end edges directed inwardly, the two trunnions being received in the said end portions and said end edges being accommodated in the grooves; a cover plate of U-section extending substantially the length of said mounting plate and fitting thereupon; means for securing the mounting plate to a piece of luggage; and means for securing the mounting plate and the cover plate together.

2. A handle for an article of luggage comprising a one-piece unreinforced moulded plastics handle proper having a pair of co-axial cylindrical trunnions each with an encircling groove thereabout; a pressed sheet-metal one-piece mounting plate which extends between and overlaps the said trunnions, said plate having U-section end portions which journal the trunnions and inturned end edges which are received in the grooves; a cover plate of U-section extending the length of said mounting plate and fitting thereupon; means for securing the mounting plate to the article of luggage; and means for securing the mounting plate and cover plate together.

3. A handle for an article of luggage comprising a handle proper, a mounting plate and a cover plate, said handle proper being of an unreinforced one-piece injection moulded thermoplastic construction, having a carrying portion, depending legs from each end of the carrying portion, and inturned co-axial cylindrical trunnions projecting from the ends of the legs, a groove encircling each trunnion adjacent the legs; said mounting plate being a sheet metal pressing of U-section with end portions embracing the trunnions and having inturned end-edges spaced apart by the length of the plate which is substantially equal to the spacing between the grooves about the respective trunnions, said inturned edges engaging in said grooves, said plate being stepped adjacent each end portion thereof and being apertured in each step to accept a corresponding fixing expedient, said plate being provided with a pair of circular holes at each end, one on each side of each said end portion; said cover plate being a sheet metal pressing of equal length to said mounting plate, having a smooth and unbroken profile, and having identations at each end, said cover plate embracing said mounting plate, masking said fixing expedients, and making snap-engagement of its indentations with the said circular holes.

References Cited by the Examiner

UNITED STATES PATENTS

| 2,913,080 | 11/59 | Louik | 190—57 |
| 3,009,551 | 11/61 | Kotkins | 190—58 |
| 3,103,268 | 9/63 | Atkinson | 190—58 |

FOREIGN PATENTS 223,664   5/58   Australia.

FRANKLIN T. GARRETT, *Primary Examiner.*

GEORGE O. RALSTON, *Examiner.*